US009045672B2

(12) United States Patent
Jialanella et al.

(10) Patent No.: US 9,045,672 B2
(45) Date of Patent: Jun. 2, 2015

(54) DUAL CURE ADHESIVE USEFUL FOR BONDING TO GLASS

(75) Inventors: Gary L. Jialanella, Oxford, MI (US); Lirong Zhou, Rochester Hills, MI (US)

(73) Assignee: Dow GlobalTechnologies LLC, Midland, MI (US)

( * ) Notice: Subject to any disclaimer, the term of this patent is extended or adjusted under 35 U.S.C. 154(b) by 0 days.

(21) Appl. No.: 13/455,294

(22) Filed: Apr. 25, 2012

(65) Prior Publication Data

US 2012/0279654 A1 Nov. 8, 2012

Related U.S. Application Data

(60) Provisional application No. 61/481,885, filed on May 3, 2011.

(51) Int. Cl.

| | |
|---|---|
| *C08F 8/30* | (2006.01) |
| *C08F 283/04* | (2006.01) |
| *C08G 18/08* | (2006.01) |
| *C08G 18/28* | (2006.01) |
| *C08L 75/00* | (2006.01) |
| *C09J 175/16* | (2006.01) |
| *C08F 299/06* | (2006.01) |
| *C08G 18/76* | (2006.01) |
| *C08G 18/86* | (2006.01) |
| *C09J 175/14* | (2006.01) |
| *C08F 290/06* | (2006.01) |
| *C08K 5/3435* | (2006.01) |
| *C08F 290/14* | (2006.01) |
| *C08K 5/00* | (2006.01) |
| *C08K 5/17* | (2006.01) |
| *C08K 5/357* | (2006.01) |
| *C08G 18/20* | (2006.01) |
| *C08K 5/14* | (2006.01) |
| *C08F 283/00* | (2006.01) |
| *C08G 18/81* | (2006.01) |
| *C08J 3/24* | (2006.01) |

(52) U.S. Cl.
CPC ............ *C09J 175/16* (2013.01); *C08F 299/065* (2013.01); *C08G 18/76* (2013.01); *C08G 18/86* (2013.01); *C09J 175/14* (2013.01); *C08F 290/067* (2013.01); *C08K 5/3435* (2013.01); *C08F 290/147* (2013.01); *C08K 5/0025* (2013.01); *C08F 283/04* (2013.01); *C08F 8/30* (2013.01); *C08K 5/17* (2013.01); *C08K 5/357* (2013.01); *C08G 18/20* (2013.01); *C08K 5/14* (2013.01); *C08F 283/006* (2013.01); *C08J 2375/14* (2013.01); *C08G 18/2081* (2013.01); *C08G 18/8175* (2013.01); *C08J 3/243* (2013.01); *C08J 2375/16* (2013.01)

(58) Field of Classification Search
CPC ...... C08F 8/30; C08F 283/006; C08F 283/04; C08F 290/067; C08F 290/147; C08F 299/065; C08G 18/20; C08G 18/2081; C08G 18/76; C08G 18/8175; C08G 18/86; C08J 3/243; C08J 2375/14; C08J 2375/16; C08K 5/0025; C08K 5/14; C08K 5/17; C08K 5/3435; C08K 5/357; C09J 175/14; C09J 175/16
USPC ................... 524/507, 589, 590; 525/123, 455
See application file for complete search history.

(56) References Cited

U.S. PATENT DOCUMENTS

| | | | |
|---|---|---|---|
| 3,525,726 A | 8/1970 | Galinke et al. | |
| 3,707,521 A | 12/1972 | De Santis | |
| 3,779,794 A | 12/1973 | De Santis | |
| 4,345,053 A | 8/1982 | Rizk et al. | |
| 4,374,237 A | 2/1983 | Berger et al. | |
| 4,525,511 A | 6/1985 | Kirby et al. | |
| 4,538,920 A | 9/1985 | Drake | |
| 4,625,012 A | 11/1986 | Rizk et al. | |
| 4,687,533 A | 8/1987 | Rizk et al. | |
| 4,780,520 A * | 10/1988 | Rizk et al. ...................... 528/53 |
| 5,063,269 A | 11/1991 | Hung | |
| 5,082,147 A | 1/1992 | Jacobs | |
| 5,115,086 A | 5/1992 | Hsieh | |
| 5,238,993 A | 8/1993 | Hsieh | |
| 5,304,612 A | 4/1994 | Umetani et al. | |
| 5,338,800 A | 8/1994 | Umetani et al. | |
| 5,410,051 A | 4/1995 | Forgione | |
| 5,466,727 A | 11/1995 | Hsieh | |

(Continued)

FOREIGN PATENT DOCUMENTS

| | | |
|---|---|---|
| CA | 772229 A | 11/1967 |
| DE | 19924139 A1 | 11/2000 |

(Continued)

OTHER PUBLICATIONS

Machine English translation of EP 0603046, Charriere, Jun. 22, 1994.*

(Continued)

*Primary Examiner* — Patrick Niland
(74) *Attorney, Agent, or Firm* — The Dobrusin Law Firm, P.C

(57) ABSTRACT

The present invention is a composition comprising: a) one or more isocyanate functional prepolymers; b) one or more compounds containing a cycloaliphatic tertiary amine; c) one or more compounds containing a peroxide group; and d) one or more acrylate containing components. The system can be used in the form of a two part adhesive or in the form of a one part adhesive and an activator adapted to be applied to the surface of one or more of the substrates to which the adhesive is to be bonded.

15 Claims, 1 Drawing Sheet

(56) References Cited

U.S. PATENT DOCUMENTS

| | | |
|---|---|---|
| 5,468,317 A | 11/1995 | Hsieh |
| 5,603,798 A | 2/1997 | Bhat |
| 5,623,044 A | 4/1997 | Chiao |
| 5,792,811 A | 8/1998 | Bhat |
| 5,852,103 A | 12/1998 | Bhat |
| 5,852,137 A | 12/1998 | Hsieh et al. |
| 5,922,809 A | 7/1999 | Bhat et al. |
| 5,976,305 A | 11/1999 | Bhat et al. |
| 6,015,475 A | 1/2000 | Hsieh et al. |
| 6,053,971 A | 4/2000 | Lin |
| 6,423,810 B1 | 7/2002 | Huang et al. |
| 6,512,033 B1 | 1/2003 | Wu |
| 6,512,039 B1 | 1/2003 | Mowrey |
| 6,559,257 B2 | 5/2003 | Quarmby |
| 6,562,881 B2 | 5/2003 | Jacobine et al. |
| 6,596,787 B1 | 7/2003 | Levandoski et al. |
| 6,673,875 B2 | 1/2004 | Attarwala et al. |
| 6,706,831 B2 | 3/2004 | Sonnenschein et al. |
| 6,709,539 B2 | 3/2004 | Zhou |
| 6,852,801 B1 | 2/2005 | Briggs et al. |
| 7,025,751 B2 | 4/2006 | Silva et al. |
| 7,025,851 B2 | 4/2006 | Caster et al. |
| 7,098,279 B2 | 8/2006 | Maandi et al. |
| 7,101,950 B2 | 9/2006 | Zhou et al. |
| 7,361,292 B2 | 4/2008 | Zhou |
| 7,408,012 B1 | 8/2008 | Kneafsey et al. |
| 7,416,599 B2 | 8/2008 | Hsieh et al. |
| 7,534,843 B2 | 5/2009 | Jialanella et al. |
| 7,737,241 B2 | 6/2010 | Feng et al. |
| 2002/0016226 A1 | 2/2002 | Jin et al. |
| 2002/0100550 A1 | 8/2002 | Mahdi et al. |
| 2004/0214912 A1 | 10/2004 | Rink |
| 2005/0126683 A1 | 6/2005 | Hsieh et al. |
| 2006/0124225 A1 | 6/2006 | Wu et al. |
| 2007/0142556 A1 | 6/2007 | Osae et al. |
| 2007/0155899 A1 | 7/2007 | Briggs et al. |
| 2008/0177004 A1 | 7/2008 | Osae et al. |
| 2009/0098388 A1 | 4/2009 | Harvey et al. |

FOREIGN PATENT DOCUMENTS

| | | |
|---|---|---|
| EP | 0603046 A1 | 6/1994 |
| EP | 0964012 A1 | 12/1999 |
| EP | 1260548 A1 | 11/2002 |
| EP | 1524282 A1 | 4/2005 |
| EP | 1557455 A1 | 7/2005 |
| GB | 1122128 A | 7/1968 |
| JP | 1982-151612 A | 9/1982 |
| JP | 1993-043650 A | 2/1993 |
| JP | 1993-239172 A | 9/1993 |
| JP | 2000-044920 A | 2/2000 |
| JP | 2014-511931 A | 5/2014 |
| WO | 02/44295 A2 | 6/2002 |
| WO | 03/040248 A2 | 5/2003 |
| WO | 2006/038999 A1 | 4/2006 |
| WO | 2010/030519 A1 | 3/2010 |
| WO | 2012/151086 A1 | 10/2012 |

OTHER PUBLICATIONS

Second Written Opinion for PCT/US2012/034870 mailed May 17, 2013.

International Search Report and Written Opinion dated Jul. 5, 2012; for Corresponding PCT Application No. US 2012/034870 filed Apr. 25, 2012.

Corresponding PCT Application No. US 2012/034870 filed Apr. 25, 2012; published as WO 2012/151086 A1 on Nov. 8, 2012

*Journal of the American Chemical Society*, vol. 49, p. 3181 (1927).

International Search report and Written Opinion dated Jul. 5, 2012 (PCT/US2012/034868).

International Preliminary report on Patentability dated May 21, 2013 (PCT/US2012/034868).

Chinese Office Action for Chinese application No. 2012800215271 dated Aug. 22, 2014.

European Office Action for European application No. 12720052.5 dated Nov. 13, 2014.

English Translation of Japanese Office Action for Japanese application No. 2014509311 dated Nov. 25, 2014.

\* cited by examiner

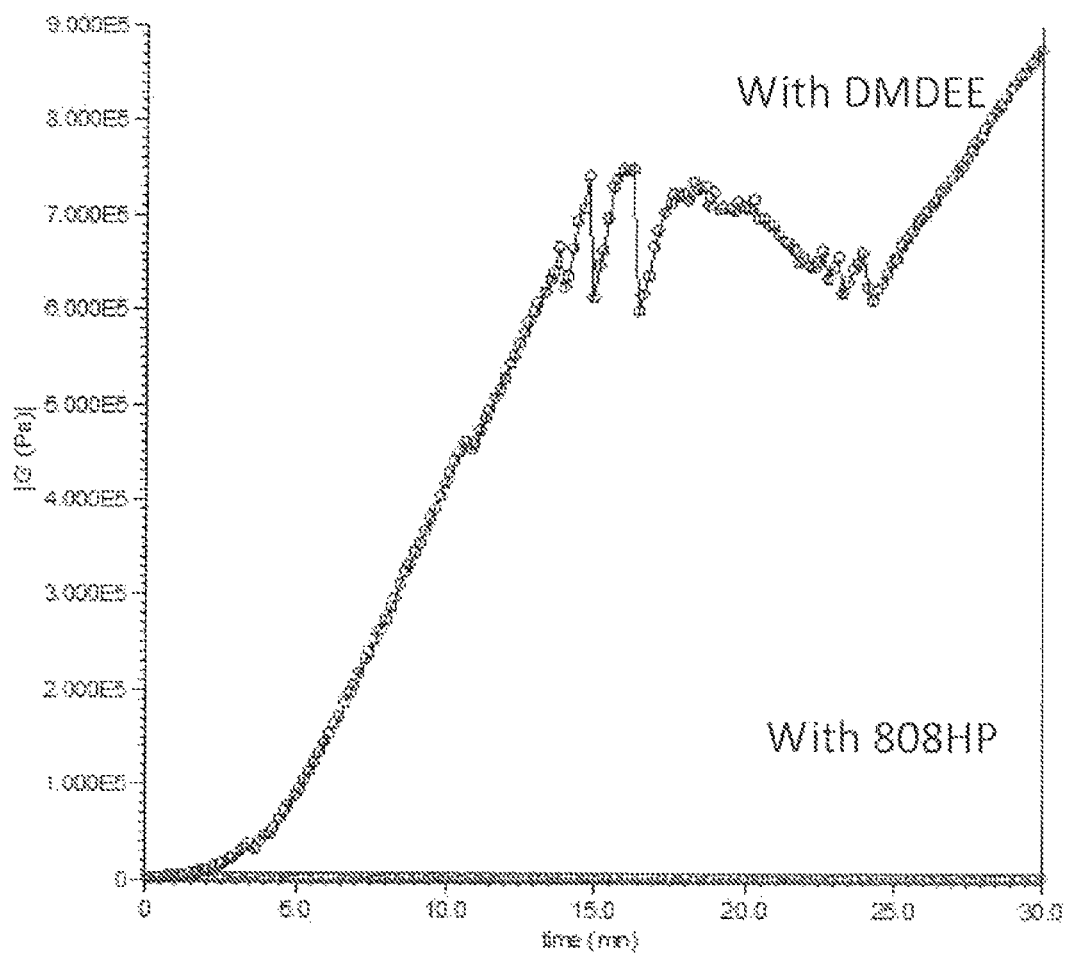

DUAL CURE ADHESIVE USEFUL FOR BONDING TO GLASS

CLAIM OF PRIORITY

This application claims priority from provisional application Ser. No. 61/481,885 filed May 3, 2011 incorporated herein by reference in its entirety.

FIELD OF THE INVENTION

The present invention relates generally to a system for bonding two substrates together-comprising one or more isocyanate functional prepolymers and one or more of acrylic (e.g. acrylate and methacrylate) containing compounds, oligomers or prepolymers and a cure acceleration system. The present invention also comprises a method of using such systems for bonding substrates together.

BACKGROUND OF THE INVENTION

Compositions having isocyanate functional components are utilized to bond substrates together, such as, glass, often in the form of windows, into structures. In automotive assembly plants windows are often bonded in with one part adhesive compositions containing isocyanate functional components. These compositions cure by reaction with ambient moisture. One part adhesives are used because the equipment required to dispense and apply them is less complex than the equipment used to apply two-part adhesives. One part moisture curing adhesives typically take several hours to cure. In the assembly plants, vehicles are not driven for several hours and this is acceptable. One part moisture curing adhesives known in the art are disclosed in U.S. Pat. Nos. 4,374,237; 4,687,533; 4,780,520; 5,063,269; 5,623,044; 5,603,798; 5,852,137; 5,922,809; 5,976,305; 5,852,137 and 6,512,033, relevant portions incorporated herein by reference. Examples of commercial one part adhesives include BETASEAL™ 15630, 15625, 61355 adhesives available from The Dow Chemical Company, EFBOND™ windshield adhesives available from Eftec, WS 151™, WS212™ adhesives available from Yokohama Rubber Company, and SIKAFLEX™ adhesives available from Sika Corporation.

Two-part compositions containing isocyanate functional prepolymers in one part and compounds having isocyanate reactive components in the other part are used where cure speed is important, such as in the automotive aftermarket replacement glass business. Customers desire that the adhesives cure quickly so that the vehicle can be driven as soon as possible after replacing the window. The advantage is that two-part adhesive cure at much faster reaction rates than one part moisture curing adhesives Examples of two-part compositions containing isocyanate functional prepolymers in one part and compounds having isocyanate reactive components in the other part are disclosed in EP 1,524,282, U.S. Pat. Nos. 5,852,103; 6,709.539; 7,101,950 and 7,361,292, relevant parts incorporated herein by reference.

Adhesives are utilized in a variety of environments and the properties required are different. Adhesive systems that allow for modification of properties to fit the environment of use or the substrates bonded are desired. Modification of the relative elasticity and modulus of adhesive is desirable. Manufacturers desire to handle products as soon as possible to enhance productivity. In modern industrial processes, there is a need to move parts and to place loads on adhesive systems as soon as possible. Adhesives which have a good green strength shortly after application are needed. Typical one part adhesives do not provide such green strength properties. Adhesive systems need a longer open time, the time from application of the adhesive to a substrate until the adhesive can no longer adhere to a substrate, than two-part adhesives allow. Open times 8 minutes to 15 minutes is desired.

Some processes used to assemble parts using reactive adhesives require cleaning of the substrate surface to remove contaminants. A primer or activator may be utilized to facilitate adhesion to the substrate. A primer or activator system may contain a film forming resin, a solvent and one or more of an adhesion promoter, catalyst; curing agent or crosslinking agent, see for example DE 19924139. In most commercial applications; primers require a minimum amount of time between application of the primer and application of the adhesive to allow % film build up. If adhesives are applied before the minimum time, the primer may not form a coherent film and there is a risk that the primer will not bond to the substrate or the adhesive surface. Many primers are moisture cure primers which require the presence of moisture to form an adequate film. Examples of primers are U.S. Pat. Nos. 5,115,086; 5,238,993; 5,466,727; 5,468,317; and 5,792,811, all incorporated herein by reference. Non-film forming solutions of adhesion promoters, often called activators, are used which may contain groups intended for reaction with the substrate and the adhesive. Examples of wipe systems include U.S. Pat. No. 6,053,971, incorporated herein by reference. Examples of adhesion promoters useful are silanes, isocyanate containing compounds, titanates and zirconates such as disclosed in U.S. Patent Publications 2005/0126683 and 2006/0124225, all incorporated herein by reference. The use of primers require process steps to apply the primer, provide two additional surfaces along which an adhesive system can fail and add process time to manufacturing processes. Moving parts or articles bonded together with adhesives or placing a load on the adhesive bond before the system builds adequate strength can result in failure of the adhesive system thus resulting in faulty parts or articles. Commonly owned application titled IMPROVED PROCESS FOR BONDING REACTIVE ADHESIVES TO SUBSTRATES published as WO 2010/030519 discloses a system, or kit, comprising i) a stable solution or dispersion of a catalyst for the curing of a reactive adhesive system; and in a separate part ii) an uncured reactive adhesive system wherein the catalyst of part i) accelerates the cure of the reactive adhesive system. This system improves the speed of link up of an adhesive to a substrate.

Thus, what are needed are adhesive systems which exhibit good green strength, rapid cure rates and the ability to allow substrates to be handled shortly after application of the adhesive system. What are also needed are adhesive systems wherein the properties can be adjusted to meet the needs of a particular substrate system.

SUMMARY OF THE INVENTION

The present invention is a composition comprising: a) one or more isocyanate functional prepolymers; b) one or more compounds containing a cycloaliphatic tertiary amine; c) one or more compounds containing a peroxide group; and d) and an acrylate containing component; and, one or more compounds containing one or more acrylate groups; wherein component a) and b) are kept separate from component c) until cure is desired. Preferably the acrylate containing component comprises one or more of one or more compounds containing one or more acrylate groups, one or more isocyanate functional prepolymers containing free acrylate groups and one or more adducts of a polyisocyanate and a compound containing one or more acrylate groups and one or more active hydrogen containing groups. The system can be used in the form of a two part composition or in the form of a one part composition and an activator. The activator can applied to the surface of one or more of the substrates to which the composition is to be bonded. Typically the activator is the one or more compounds containing a cycloaliphatic tertiary amine, which is preferably disposed in a solvent or dispersant therefor. In another embodiment, the invention comprises a method comprising: i) contacting the two parts of a composition of this invention; ii) contacting the contacted parts of the composition of the invention with one or both of a first substrate and/or a second substrate; iii) contacting the first substrate and the second substrate with the contacted composition disposed between the two substrates; iv) allowing the composition of the invention to cure and bond the two substrates together. Preferably, the two parts of the composition contacted in step i) are mixed prior to contacting the composition with a substrate. In another embodiment, the invention is a method comprising: i) contacting an activator comprising one or more compounds containing a cycloaliphatic tertiary amine with a surface of one or both of a first substrate and a second substrate; ii) contacting a composition comprising a) one or more isocyanate functional prepolymers, optionally containing free acrylate groups; c) one or more compounds containing a peroxide group; and d) and an acrylate containing component with either of the first substrate or the second substrate; iii) contacting the first substrate with the second substrate with the composition disposed between the two substrates; iv) allowing the composition to cure and bond the two substrates together. In another embodiment the invention is a method comprising: i) contacting the activator with a one part composition according to the invention; ii contacting the adhesive and activator with either of the first substrate or the second substrate; iii) contacting the first substrate with the second substrate with the one part composition disposed between the two substrates; and iv) allowing the composition to cure and bond the two substrates together.

The compositions and methods of the invention allow substrates to be adhered together rapidly. This allows the bonded substrates to be handled or used after short curing times. The compositions properties can be adjusted to fit the requirements, of the systems bonded together. The cured compositions preferably demonstrate an adhesive strength as measured by lap shear strength according to SAE J1529 of 0.5 MPa or greater after 30 minutes from composition application or 0.25 MPa or greater after 15 minutes from adhesive application. The compositions are useful as adhesives to bond substrates together and may be used to bond similar and dissimilar substrates together, for instance, plastics, glass, wood, ceramics, metal, coated substrates and the like. The compositions are especially useful for bonding glass to other substrates, such as vehicles and buildings and parts of modular components together, such as vehicle modular components. The glass can be bonded to coated and uncoated portions of vehicles. In one embodiment the composition bonds well to window flanges having cured residual polyurethane or siloxy functional polyolefins or polyethers disposed thereon.

DESCRIPTION OF THE DRAWINGS

FIG. 1 is a graph of G' modulus versus time after mixing of adhesives with two different activators.

DETAILED DESCRIPTION

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent, applications and publications, are incorporated by reference for all purposes. Other combinations are also possible as will be gleaned from the following claims, which are also hereby incorporated by reference into this written description.

One or more as used herein means that at least one, or more than one, of the recited components may be used as disclosed. Nominal as used with respect to functionality means the theoretical functionality, generally this can be calculated from the stoichiometry of the ingredients used. Generally, the actual functionality is different due to imperfections in raw materials, incomplete conversion of the reactants and formation of by-products. Durability in this context means that the composition once cured remains sufficiently strong to perform its designed function, in the embodiment wherein the cured composition is an adhesive, the adhesive holds substrates together for the life or most of the life of the structure containing the cured composition. As an indicator of this durability, the curable composition (e.g. adhesive) preferably exhibits excellent results during accelerated aging. Preferably this means that after a set of substrates bonded with the composition of the invention is exposed to heat aging, the failure mode in Quick Knife adhesion or Lap Shear testing is cohesive, meaning the adhesive breaks before the bond of the adhesive to the substrate breaks. Isocyanate content means the weight percent of isocyanate groups in the designated component, such as prepolymer, or composition, such as adhesive composition. The isocyanate content can be measured by analytical techniques known to one skilled in the art, for example by potentiometric titration with an active hydrogen containing compound, such as dibutyl amine. The free acrylate content means the weight percent of acrylate groups available for reaction present in the designated component, such as the prepolymer, adduct of a polyisocyanate and one or more compounds containing one or more acrylate groups and one or more active hydrogen containing groups, and acrylate containing monomers, or in the composition, such as an adhesive. Residual content of a component refers to the amount of the component present in free form or reacted with another material, such as an adduct as described herein or a prepolymer. Typically, the residual content of a component can be calculated from the ingredients utilized to prepare the component or composition. Alternatively, it can be determined utilizing known analytical techniques. Heteroatom means nitrogen, oxygen, sulfur and phosphorus, more preferred heteroatoms include nitrogen and oxygen. Hydrocarbyl as used herein refers to a group containing one or more carbon atom backbones and hydrogen atoms, which may optionally contain one or more heteroatoms. Where the hydrocarbyl group contains heteroatoms, the heteroatoms may form one or more functional groups well known to one skilled in the art. Hydrocarbyl groups may contain cycloaliphatic, aliphatic, aromatic or any combination of such segments. The aliphatic segments can be straight or branched. The aliphatic and cycloaliphatic segments may include one or more double and/or triple bonds. Included in hydrocarbyl groups are alkyl, alkenyl, alkynyl, aryl, cycloalkyl, cycloalkenyl, alkaryl and aralkyl groups. Cycloaliphatic groups may contain both cyclic portions and noncyclic portions. Hydrocarbylene means a hydrocarbyl group or any of the described subsets having more than one valence, such as alkylene, alkenylene, alkynylene, arylene, cycloalkylene, cycloalkenylene, alkarylene and aralkylene. The term isocyanate-reactive compound as used herein includes any organic compound having nominally at least two isocyanate-reactive groups. For the purposes of this invention, isocyanate-reactive groups, active hydrogen containing groups, refer to a group containing a hydrogen atom which, because of its position in the molecule, displays significant activity according to the Zerewitinoff test described by Wohler in the *Journal of the American Chemical Society*, Vol. 49, p. 3181 (1927). Illustrative of such isocyanate-reactive groups, active hydrogen groups, are —COOH, —OH, —NH$_2$, —NH—, —CONH$_2$, —SH, and —CONH—. Preferable compounds containing isocyanate-reactive groups include polyols, polyamines, polymercaptans and polyacids. More preferably, the isocyanate reactive compound is a polyol, and is even more preferably a polyether polyol.

The compositions of this invention can be any reactive system containing isocyanate functional components which are curable. Reactive means herein that the curable composition (e.g. adhesive) contains components which react to form a polymeric matrix that is set irreversibly once cured. The curable systems can be either one or two-part systems. More preferred are two part systems. Preferably the curable systems are useful as adhesives.

The compositions of the invention may further comprise any one or more of the following features: the weight ratio of one or more compounds containing a peroxide group to the one or more compounds containing a cycloaliphatic tertiary amine is from about 1.0:1.0 to about 200:1.0; the active hydrogen containing groups on the one or more compounds containing one or more acrylate groups and one or more active hydrogen containing groups are hydroxyl or amine groups; the composition contains from about 1 to about 30 percent by weight of one or more compounds or the residue of one or more compounds containing one or more acrylate groups; the composition contains from about 5 to about 30 percent by weight of one or more compounds or the residue of one or more compounds containing one or more acrylate groups; the composition contains from about 1 to about 60 percent by weight of free acrylate groups; the one or more isocyanate containing prepolymers contain from about 0.1 to about 35 percent by weight of free isocyanate groups; the composition is a two part adhesive; the free acrylate content of the isocyanate functional prepolymers is about 1.0 to about 20 percent by weight; wherein the composition comprises, a) from about 10 to about 70 percent by weight of one or more isocyanate functional prepolymers; b) from about 0.05 to about 20.0 percent by weight of one or more compounds containing a cycloaliphatic tertiary amine: c) from about 0.05 to about 5 percent by weight of one or more compounds containing a peroxide group; d) from about 1 to about 70 percent by weight one or more: of one or more acrylate containing components; the composition comprises a one part adhesive and activator wherein the one part adhesive comprises a) one or more isocyanate functional prepolymers; c) one or more compounds containing a peroxide group; d) one or more of one or more isocyanate functional prepolymers further comprising free acrylate groups, one or more adducts of a polyisocyanate and a compound containing one or more acrylate groups and one or more active hydrogen containing groups, and one or more compounds containing one or more acrylate groups and the activator comprises one or more compounds containing a cycloaliphatic tertiary amine; and the activator further comprises a solvent or dispersant for the one or more compounds containing a cycloaliphatic tertiary amine; a portion or all of the one or more isocyanate functional prepolymers contain free acrylate-groups: the free acrylate content of the isocyanate functional prepolymers is about 0.05 to about 10.0 percent by weight.

The methods of the invention may further comprise any one or more of the following features: a method comprising, i) contacting the two parts of the composition of the invention; ii) contacting the contacted composition of i) with a first substrate; iii) contacting the first substrate with a second substrate with the composition of i) disposed between the two substrates; iv) allowing the composition of i) to cure and bond the two substrates together; wherein after step iii) the contacted substrates are exposed to elevated temperatures to accelerate the cure of the composition of i); a method comprising: i) contacting an activator according to the invention with a surface of one or both of a first substrate and a second substrate; ii contacting the composition of the invention with either of the first substrate or the second substrate; iii) contacting the first substrate with the second substrate with the composition disposed between the two substrates; and iv) allowing the composition to cure and bond the two substrates together; wherein the solvent or dispersant of the activator is allowed to flash off before the adhesive is contacted with the one or both surfaces to which the activator was applied; wherein the first substrate is glass, transparent plastic wherein the glass or transparent plastic may have an organic or ceramic enamel frit located about the periphery of the glass or transparent plastic; wherein the second substrate is plastic or metal which may be coated: wherein after step iii) the contacted substrates are exposed to elevated temperatures to accelerate the cure of the composition; a method comprising, i) contacting the activator with the composition according to the invention; ii contacting the composition and activator with either of the first substrate or the second substrate; iii) contacting the first substrate with the second substrate with the composition disposed between the two substrates; iv) allowing the composition to cure and bond the two substrates together; and the two parts are mixed before contacting with the first substrate.

Isocyanate based (polyurethane or polyurea forming) curable systems comprise an isocyanate functional component. An isocyanate functional component contains one or more compounds having on average more than one isocyanate functional group per molecule. The isocyanate functional compound can be any compound which contains on average more than one isocyanate moiety. The isocyanate functional compound can be in the form of an isocyanate functional prepolymer or in the form of a monomer or oligomer having on average greater than 1 isocyanate group, and preferably 2 or more isocyanate groups. The isocyanate prepolymer can by any prepolymer prepared by reaction of an isocyanate functional compound with one or more compounds having on average more than one isocyanate reactive functional groups, such as hydroxyl, amine, thiol, carboxyl and the like, under conditions such that the prepolymer prepared have on average more than one isocyanate moiety (group) per molecule.

Isocyanate functional component based systems can be one part or two-part systems. The isocyanate functional component is present in the curable compositions in a sufficient amount to form a cured component when exposed to curing conditions. In two-part compositions, useful as adhesives, the isocyanate functional component when combined with isocyanate reactive compounds is capable of bonding substrates together in a manner that the substrates remain bound together when exposed to temperatures of about −30° C. to about 100° C. for long periods of time, such as 10 years; and up to temperatures of about 180° C. for short periods of up to 30 minutes.

In a one-part system, the isocyanate functional component further comprises a catalyst and other components as described hereinafter. The one component compositions typically cure by moisture curing. Once formulated the one-part compositions are packaged in air and moisture proof containers to prevent curing before application.

The curable system of the invention may be a two-part isocyanate functional component containing curable system. The two parts are reactive with one another and when contacted undergo a curing reaction. One part of the composition comprises, or contains, an isocyanate functional component. This is typically referred to as the resin side or A side. The other component of the composition is an isocyanate reactive component which comprises, or contains, one or more compounds, oligomers or prepolymers having on average more than one group reactive with isocyanate moieties as described herein. The second part is commonly known as the curative or B side. Compounds having on average one or more isocyanate reactive groups can be prepolymers, or can be small chain compounds, such as difunctional chain extenders or polyfunctional crosslinking agents. Typically, the chain extenders and crosslinking agents have a molecular weight of about 250 Daltons or less. The reaction product is a cured product which is capable of bonding certain substrates together. In two part compositions, the a) one or more isocyanate functional prepolymers, optionally containing free acrylate groups; and b) one or more compounds containing a cycloaliphatic tertiary amine; are preferably kept separate from the c) one or more compounds containing a peroxide group. Preferably the a) one or more isocyanate functional prepolymers, optionally containing free acrylate groups; and b) one or more compounds containing a cycloaliphatic tertiary amine are located in the resin or A side. Preferably the c) one or more compounds containing one or more peroxide groups are located in the curative or B) side. Preferably the resin or A) side is packaged and stored in a moisture proof container prior to use to prevent undesirable curing of the prepolymer. The curative or B) side may also be so packaged. The acrylate containing component, except for isocyanate functional prepolymers containing acrylate groups, may be located in either part, or both parts, of a two part composition and can be used to adjust the volume of the parts.

The one or more isocyanate functional components, preferably prepolymers, are present in sufficient quantity to provide cohesive strength, and in adhesive uses, adhesive character to the composition. Such isocyanate functional components, such as prepolymers, have an average isocyanate functionality sufficient to allow the preparation of a crosslinked polyurethane upon cure and not so high that the polymers are unstable. Prepolymers useful as isocyanate functional components are prepared by reacting one or more polyisocyanates with one or more compounds containing on average more than one isocyanate reactive group per molecule. The isocyanate functional components, prepolymers, preferably have a free isocyanate content which facilitates acceptable strength in the compositions prepared therefrom, preferably after 30 minutes, more preferably after 15 minutes. In one part compositions, preferably the free isocyanate content is about 0.1 percent by weight or greater based on the weight of the isocyanate functional components, more preferably about 1.2 percent by weight or greater, even more preferably about 1.4 percent by weight or greater, and most preferably about 1.6 percent by weight or greater. The isocyanate content in the isocyanate functional components is preferably about 10 percent or less based on the weight of the prepolymer, more preferably about 5.0 percent or less, even more preferably about 3.0 percent or less, even more preferably about 2.2 percent by weight or less, even more preferably about 2.0 or less, and most preferably about 1.8 percent by weight or less. For two-part isocyanate based systems, the isocyanate content in the isocyanate functional components is preferably about 1 percent by weight or greater based on the weight of the isocyanate functional components, more preferably about 2 percent by weight or greater, even more preferably about 6 percent or greater, even more preferably about 8 percent by weight or greater and most preferably about 10 percent by weight or greater. For two-part isocyanate based systems, the isocyanate content in the isocyanate functional components is preferably about 35 percent by weight or less based on the weight of the isocyanate functional components, more preferably about 25 percent by weight or less, even more preferably about 20 percent by weight and most preferably about 15 percent by weight or less.

Isocyanate functional components may further comprise free acrylate groups. Free acrylate groups may be incorporated into the isocyanate functional components, such as prepolymers, by reacting a portion of terminal isocyanate groups with one of more compounds containing one or more active hydrogen containing groups and one or more acrylate groups. Alternatively, the acrylate groups can be incorporated into the isocyanate functional components by adding such compounds to the reaction mixture used to prepare the prepolymer. Where the one of more compounds containing one or more active hydrogen containing groups and one or more acrylate groups have only one active hydrogen containing group, the acrylate groups will be located on the end of the polymer chains. Where the one of more compounds containing one or more active hydrogen containing groups and one or more acrylate groups have more than one active hydrogen containing groups, the acrylate groups may be pendant from the backbone of the prepolymer or located at the end of the polymer chains based on the ratio of such compounds having one active hydrogen containing group or to those having more than one active hydrogen group. Where the one of more compounds containing one or more active hydrogen containing groups and one or more acrylate groups have two or more active hydrogen groups, most of the acrylate groups will be located pendant from the backbone of the chain. If there is an excess of isocyanate groups in the reaction mixture the prepolymer will have most, if not substantially all (greater than about 99 percent by weight) of the terminal groups as isocyanate groups. If there is less than an excess of isocyanate groups, the prepolymers will have, a mix of isocyanate and acrylate groups as terminal groups. It is preferred that there be a low amount of active hydrogen containing groups at the terminus of the prepolymers as this could negatively impact the stability of the prepolymer. The free isocyanate content of the prepolymer is selected to provide the desired properties of the composition with respect to cohesive strength, elasticity and adhesive strength. The acrylate content is chosen to provide the desired cure speed as measured by lap shear strength at a specified time and modulus as described hereinbefore. The ratio of free isocyanate content and free acrylate content is chosen to give the desired balance of properties and will be impacted by the presence of other components in the composition such as acrylate containing components, and other active hydrogen containing compounds or isocyanate containing compounds. Preferably the acrylate content is about 1.0 percent by weight or greater based on the weight of the prepolymer, more preferably about 5.0 or greater, even more preferably about 10 percent by weight or greater and most preferably about 15 percent by weight or greater. Preferably the acrylate content is about 60 percent by weight or less based on the weight of the prepolymer, more preferably about 40 percent by weight or less, even more preferably about 30 percent by weight or less and most preferably about 20 percent by weight or less. The one of more compounds containing one or more active hydrogen containing groups and one or more acrylate groups can be any compound, adduct, oligomer or prepolymer containing one of more compounds containing one or more active hydrogen groups and one or more acrylate groups. Preferably such compounds are compounds or adducts and more preferably compounds.

The one of more compounds containing one or more active hydrogen containing groups and one or more acrylate groups can be any compound which contains the recited groups. The active hydrogen groups can be any active hydrogen containing groups as described herein. Preferred active hydrogen groups include amino, hydroxyl and thiol groups, even more preferably amino and hydroxyl groups, with hydroxyl most preferred. Preferably the one of more compounds containing one or more active hydrogen containing groups and one or more acrylate groups correspond to the formula

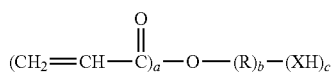

wherein: R is separately in each occurrence a hydrocarbylene group, optionally containing one or more heteroatoms; X is separately in each occurrence $NR^2$, O or S; $R^2$ is separately in each occurrence hydrogen or a hydrocarbyl group, optionally containing one or more heteroatoms; a is separately in each occurrence an integer of from about 1 to 6; b is separately in each occurrence 0 or 1; c is separately in each occurrence an integer of from about 1 to 6. R is preferably $C_{1-30}$ hydrocarbylene optionally containing one or more heteroatoms; more preferably $C_{1-20}$ alkylene, alkenylene, alkynylene, arylene, cycloalkene, cycloalkenylene, alkarylene, or aralkylene groups or a $C_{4-30}$ polyalkylene polyether, even more preferably $C_{1-20}$ alkarylene, alkylene or cycloalkylene or $C_{4-30}$ polyalkylene ether; and most preferably a $C_{2-6}$ alkylene group, $C_{13-20}$ alkyl bridged biphenylene group or $C_{4-30}$ polyalkylene polyol. $R^2$ is preferably in each occurrence a $C_{1-13}$ alkyl group, $C_{6-12}$ aryl or alkaryl group and most preferably $C_{1-4}$ alkyl or phenyl. X is preferably O or NH and most preferably O. Preferably, a is separately in each occurrence 1 to 4, even more preferably 1 to 2, and most preferably 1. Preferably, c is separately in each occurrence 1 to 4 and most preferably 1 to 2. Exemplary compounds containing one or more active hydrogen containing groups and one or more acrylate groups include, but are not limited to, hydroxyethyl acrylate, hydroxyethyl methacrylate, aminoethyl methacrylate, 3-hydroxypropyl methacrylate, aminopropyl methacrylate, hydroxyhexyl acrylate, t-butylaminoethyl methacrylate, hydroxy octyl methacrylate, hydroxybutyl methacrylate, hydroxybutyl acrylate, 3-hydroxypentyl acrylate, 6-hydroxynonyl acrylate, 3-hydroxypropyl methacrylate, 2-hydroxypentyl methacrylate, 5-hydroxypentyl methacrylate, 7-hydroxyheptyl methacrylate, 5-hydroxydecyl methacrylate, N-hydroxymethyl acrylamide, N-hydroxymethyl methacrylamide, diethylene glycol monoacrylate, diethylene glycol monomethacrylate, glycerin dimethacrylate, tri-methylol propane dimethacrylate, alkoxylated hydroxyethyl acrylate, trimethylolpropane diacrylate, alkoxylated trimethylolpropane diacrylate, reaction products of polyether glycols of acrylic or methacrylic acid, the monoacrylate or monomethacrylate esters of bisphenol-A, the fully hydrogenated derivative of bisphenol-A, cyclohexyl diol, and the like. More preferably the compounds containing one or more active hydrogen containing groups and one or more acrylate groups include hydroxymethyl(meth)acrylate, 2-hydroxyethyl hydroxyethyl(meth)acrylate, hydroxylpropyl(meth)acrylate, and 2-hydroxy propyl(meth)acrylate. The compounds containing one or more active hydrogen containing groups and one or more acrylate groups are utilized in a sufficient amount to prepare prepolymers having the desired free acrylate content or when added to the composition separately to achieve the desired acrylate content in the composition as described herein.

Preferably, the polyisocyanates for use in preparing the isocyanate useful components of the invention include any aliphatic, cycloaliphatic, araliphatic, heterocyclic or aromatic polyisocyanate, or mixtures thereof. Preferably, the polyisocyanates used have an average isocyanate functionality of about 2.0 or greater and an equivalent weight of about 80 or greater. Preferably, the isocyanate functionality of the polyisocyanate is about 2.0 or greater, more preferably about 2.2 or greater, and is most preferably about 2.4 or greater; and is preferably about 4.0 or less, more preferably about 3.5 or less, and most preferably about 3.0 or less. Higher functionality may also be used, but may cause excessive cross-linking, and result in a composition which is too viscous to handle and apply easily, and can cause the cured composition to be too brittle. Preferably, the equivalent weight of the polyisocyanate is about 80 or greater, more preferably about 110 or greater, and is most preferably about 120 or less; and is preferably about 300 or less, more preferably about 250 or less, and most preferably about 200 or less. Examples of preferable polyisocyanates include those disclosed by Wu, U.S. Pat. No. 6,512,033 at column 3, line 3 to line 49, incorporated herein by reference. More preferred isocyanates are aromatic isocyanates, alicyclic isocyanates and derivatives thereof. Preferably, the aromatic isocyanates have the isocyanate groups bonded directly to aromatic rings. Even more preferred polyisocyanates include diphenylmethane diisocyanate and polymeric derivatives thereof, isophorone diisocyanate, tetramethylxylene diisocyanate. 1,6-hexamethylene diisocyanate and polymeric derivatives thereof, bis(4-isocyanatocyclohexyl)methane, and trimethyl hexamethylene diisocyanate. The most preferred isocyanate is diphenylmethane diisocyanate. The amount of isocyanate containing compound used to prepare the prepolymer is that amount that gives the desired properties, that is, the appropriate free isocyanate content and viscosities as discussed hereinbefore. Preferably the isocyanate functional prepolymers are the reaction product of one or more polyisocyanates one or more isocyanate reactive compounds wherein an excess of polyisocyanate is present on an equivalents basis. Preferably, the isocyanates are used to prepare in the prepolymer in an amount of about 1.3 equivalents of isocyanate (NCO) per equivalent of active hydrogen or greater, more preferably about 1.4 equivalents of isocyanate or greater and most preferably about 1.5 equivalents of isocyanate or greater. Preferably, the polyisocyanates used to prepare the prepolymer are used in an amount of about 2.0 equivalents of isocyanate per equivalent of active hydrogen or less, more preferably 1.8 equivalents of isocyanate or less and most preferably about 1.6 equivalents of isocyanate or less.

Preferably the isocyanate functional prepolymers are the reaction-product of one or more polyisocyanates with one or more compounds having more than one, preferably two or more, isocyanate-reactive groups wherein an excess of polyisocyanate is present on an equivalents basis. A preferred class of such compounds includes polyols, preferably a mixture of one or more polyether diols and/or one or more polyether triols. The diols and triols are generically referred to as polyols. Preferably, polyols useful in the preparation of the prepolymers include those disclosed in Wu, U.S. Pat. No. 6,512,033 at column 4, line 10 to line 64, incorporated herein by reference, and include, for example, polyether polyols, polyester polyols, poly(alkylene carbonate)polyols, hydroxyl containing polythioethers and mixtures thereof. Preferred polyols are polyether polyols containing one or more alkylene oxide units in the backbone of the polyol. Preferred alkylene oxide units are ethylene oxide, propylene oxide, butylene oxide and mixtures thereof. The alkylene oxides can contain straight or branched chain alkylene units. Preferably, the polyol contains propylene oxide units, ethylene oxide units or a mixture thereof. In the embodiment where a mixture of alkylene oxide units is contained in a polyol, the different units can be randomly arranged or can be arranged in blocks of each of the alkylene oxides. In one preferred embodiment, the polyol comprises propylene oxide chains with ethylene oxide chains capping the polyol. Preferably the ethylene oxide capped polypropylene oxides are hydrophobic, and preferably contain less than about 20 mole percent of ethylene oxide and more preferably less than 10 mole percent of ethylene oxide in the backbone. In a preferred embodiment, the polyols are a mixture of diols and triols. Preferably, the isocyanate-reactive compound has a functionality of about 1.8 or greater, more preferably about 1.9 or greater, and is most preferably about 1.95 or greater; and is preferably about 4.0 or less, more preferably about 3.5 or less, and is most preferably about 3.0 or less. Preferably, the equivalent weight of the isocyanate-reactive compound is about 200 or greater, more preferably about 500 or greater, and is more preferably about 1,000 or greater; and is preferably about 5,000 or less, more preferably about 3,000 or less, and is most preferably about 2,500 or less. The isocyanate reactive components, such as polyols, are present in an amount sufficient to react with most of the isocyanate groups of the isocyanates leaving enough isocyanate groups to correspond with the desired free isocyanate content of the prepolymer. Preferably, the isocyanate reactive components are present in an amount of about 50 parts by weight or greater based on the prepolymer, more preferably about 65 parts by weight or greater and most preferably about 80 parts by weight or greater. Preferably, the isocyanate reactive components are present in an amount of about 90 parts by weight or less based on the prepolymer and most preferably about 85 parts by weight or less. The isocyanate functional prepolymers may contain alkoxy silane moieties. All of the isocyanate functional prepolymers used in the adhesive may contain alkoxysilane moieties or such prepolymers may be blended with one or more isocyanate functional prepolymers which do not contain alkoxy silane moieties. The isocyanate functional prepolymers may contain sufficient alkoxy silane moieties to improve the adhesion to substrates, for instance glass and coated substrates. The alkoxy silane content in the prepolymers is preferably about 0.1 percent by weight or greater, more preferably about 0.4 percent by weight or greater and most preferably about 0.8 percent by weight or greater. The alkoxy silane content in the prepolymers is preferably about 3.0 percent by weight or less, more preferably about 2.0 percent by weight or less and most preferably about 1.0 percent by weight or less. "Alkoxy silane content" means the weight percentage of alkoxy silane moieties to the total weight of the prepolymer.

In one preferred embodiment, the compositions further comprise one or more prepolymers containing one or more organic based polymers dispersed therein. Preferably, the organic based polymer is included in the prepolymer by inclusion of a dispersion triol having dispersed therein particles of an organic based polymer. The preferable dispersion triols are disclosed in Zhou, U.S. Pat. No. 6,709,539 at column 4, line 13 to column 6, line 18, incorporated herein by reference. Preferably, the triols used to disperse the organic particles comprise one or more polyether triols and more preferably one or more polyoxyalkylene based triols. Preferably, such polyoxyalkylene oxide triols comprise polyoxypropylene chains with polyoxyethylene end caps. In one embodiment, the prepolymer also comprises a dispersion triol having dispersed therein particles of an organic based polymer. Preferably, the triols exhibit molecular weights of about 8,000 or less and more preferably about 7,000 or less. Preferably, the particles dispersed in the dispersion triol comprise one or more of thermoplastic polymers, rubber-modified thermoplastic polymers or a polyureas dispersed in one or more triols. The polyureas preferably comprise the reaction product of one or more polyamines and one or more polyisocyanates. Preferably such dispersion triol based prepolymers are contained in the adhesive in an amount of about 5 percent by weight or less.

The prepolymers may be prepared by any suitable method, such as bulk polymerization and solution polymerization. The reaction to prepare the prepolymers is carried out under anhydrous conditions, preferably under an inert atmosphere such as a nitrogen blanket and to prevent crosslinking of the isocyanate groups by atmospheric moisture. The reaction is preferably carried out at a temperature between about 0° C. and about 150° C., more preferably between about 25° C. and about 90° C., until the residual isocyanate content determined by titration of a sample is very close to the desired theoretical value. The reactions to prepare the prepolymer may be carried out in the presence of urethane catalysts. Examples of such catalysts include the stannous salts of carboxylic acids, such as stannous octoate, stannous oleate, stannous acetate, and stannous laurate; dialkyltin dicarboxylates, such as dibutyltin dilaurate and dibutyltin diacetate: tertiary amines and tin mercaptides. The amount of catalyst employed is generally from about 0.005 to about 5 parts by weight of the mixture catalyzed, depending on the nature of the isocyanate. Preferably, the reaction is carried out in admixture with a plasticizer.

The isocyanate functional components, such as prepolymers, are present in the composition of the invention in a sufficient amount such that the cured composition has sufficient strength for its designed purpose, in the case of adhesive systems such that the adhesive is capable of bonding substrates together and to provide the desired cohesive and adhesive strengths. Preferably, the isocyanate functional components are present in an amount of about 10 percent by weight or greater based on the weight of the composition, more preferably about 30 percent by weight or greater and most preferably about 50 percent by weight or greater. Preferably, the isocyanate functional components are present in an amount of about 70 percent by weight or less based on the weight of the composition, more preferably about 60 percent by weight or less and most preferably about 55 percent by weight or less.

The compositions of the invention comprise one or more compounds containing one or more cycloaliphatic tertiary amines. In an embodiment wherein the composition is a two part composition, the one or more compounds containing one or more cycloaliphatic tertiary amines are located in one part and the peroxide containing compound is located in the other part. In the embodiment wherein the composition is a one part composition the one or more compounds containing one or more cycloaliphatic tertiary amines are located in an activator which is applied to one or more substrates prior to applying the one part composition to the one or more substrates or which is blended with the composition just prior to application. To speed up link up to a substrate the activator with the one or more compounds containing one or more cycloaliphatic tertiary amines can be applied to one or more substrates when a two part composition is utilized and the composition may or may not contain one or more compounds containing one or more cycloaliphatic tertiary amines in one part of the composition. The one or more compounds containing one or more cycloaliphatic tertiary amines may comprise one or more compounds having one of more cycloaliphatic tertiary amine groups. Exemplary compounds containing one or more cycloaliphatic tertiary amines include dimorpholino dialkyl ethers. Preferred are the dimorpholino dialkyl ethers including dimorpholino diethyl ether and di(dialkylmorpholino) dialkyl ethers such as di(dimethylmorpholino)diethyl ether. The one or more compounds containing one or more cycloaliphatic tertiary amines are present in a composition of the invention in sufficient amount to initiate free radical polymerization when contacted with one or more peroxide group containing compounds and/or catalyze the reaction of isocyanate functional groups with isocyanate reactive groups. In this embodiment the one or more compounds containing one or more cycloaliphatic tertiary amines are present in an amount of about 0.05 percent by weight or greater based on the weight of the composition, more preferably about 0.1 percent by weight or greater and most preferably about 0.5 percent by weight or greater. In this embodiment the one or more compounds containing one or more cycloaliphatic tertiary amine groups are present in an amount of about 20 percent by weight or less based on the weight of the composition, more preferably about 5.0 percent by weight or less and most preferably about 1.0 percent by weight or less. In the embodiment wherein the one or more compounds containing one or more cycloaliphatic tertiary amine groups are located in an activator composition, the one or more compounds containing one or more cycloaliphatic tertiary amine groups are present in an amount sufficient to facilitate the bonding of the composition to the substrate and initiation of free radical polymerization at and near the surface of the composition contacted with the surface to which the activator was applied. The specific amount is selected to facilitate the level of cure at the surface of the composition and may be based on the concentrations provided hereinbefore.

In the embodiment where the one or more compounds containing one or more cycloaliphatic tertiary amine groups are located in an activator composition. The composition preferably further comprises one or more volatile solvents or dispersants. The solvent or dispersant can be any solvent or dispersant which forms a stable solution or dispersion of the one or more compounds containing one or more cycloaliphatic tertiary amine groups. Stable means the compounds remain in dispersion or solution until applied to the substrate surface. Preferably, the solvent or dispersant is volatile under conditions that the solution or dispersion is applied to the substrate. It is desirable for the solvent or dispersant to evaporate away or flash off as rapidly as possible after application to the substrate. Preferably, the solution or dispersion leaves only the one or more compounds containing one or more cycloaliphatic tertiary amine groups on the surface of the substrate after the solvent or dispersant flashes off. The solvent is present in a sufficient amount to form a stable solution or dispersion of the compound containing a cyclic tertiary amine group in the activator composition. The upper limit on the solvent or dispersant is practicality as it is desirable to reduce the amount of the volatile solvent present. The solvent or dispersant is present in an amount of about 1.0 percent by weight or greater based on the weight of the activator composition, more preferably about 50 percent by weight or greater, even more preferably about 70 percent by weight or greater and most preferably about 80 percent by weight or greater. The solvent or dispersant is present in an amount of about 93 percent by weight or less based on the weight of the activator composition and most preferably about 90 percent by weight or less. In another embodiment, the solution or dispersant can contain a marker which allows an operator of the process to confirm that the solution or dispersion was applied. Such markers include fluorescing components which are readily available from numerous sources, for example, Aldrich Chemical Co., Milwaukee, Wis. As a specific example, the fluorescing component can be Uvitex OB brand fluorescing agent available from Ciba Specialty Chemicals, Tarrytown, N.Y. (USA). The amount of fluorescing agent added to the activator solution or dispersion is selected such that the area of the substrate (e.g. window) treated with the activator solution or dispersion is apparent when the substrate is illuminated with an ultraviolet light. In this embodiment, the marker can be left on the substrate surface along with the one or more compounds containing one or more cycloaliphatic tertiary amine groups. Among preferred solvents or dispersants are cycloaliphatic hydrocarbons, aliphatic hydrocarbons, aromatic hydrocarbons, ketones, esters, ethers or alcohols with cycloaliphatic hydrocarbons aliphatic hydrocarbons, aromatic hydrocarbons being more preferred. More preferred solvents or dispersants are aliphatic hydrocarbons. Among preferred aliphatic hydrocarbons are hexane, heptane and octane. Among preferred cycloaliphatic hydrocarbons is cyclohexane. Among preferred aromatic hydrocarbons are toluene and xylene.

The activator may contain one or more high molecular weight resins. The high molecular weight resins are present for the purpose of forming a film which provides strength to the composition and/or protects the substrate from environmental attack. Any high molecular weight resin which forms a film upon evaporation of water may be used. The high molecular weight resin can have functional groups which react into the curable composition or which react with the surface of the substrate. Alternatively, reactive functional groups are not required for the high molecular weight resin to work in the compositions. Examples of useful functional groups are hydroxyl, carboxyl, isocyanato, alkoxysilane, mercaptosilane, epoxy functional groups, mixtures thereof and the like. More preferred functional groups are hydroxyl, carboxyl, isocyanato, alkoxysilane, isocyanato and mixtures thereof. Even more preferred functional groups are isocyanato and alkoxysilane. Preferred alkoxysilanes are di- or tri-methoxy silanes. Preferred classes of resins are acrylics, isocyanate functional prepolymers, alkoxysilane resins, polyesters and the like, with acrylics, isocyanate functional prepolymers and alkoxysilane based resins more preferred. More preferred resins are Vestoplast® 206 silanated amorphous polyolefins available from Degussa, SAX 400 and SAX 200 silyl functional polypropylene oxide based polymers available from Kaneka and silane terminated polyurethanes. The resins preferably have a molecular weight which facilitates the formation of a strong film upon evaporation of the solvent. Preferably the high molecular weight resins have an weight average molecular weight of about 5,000 or greater, more preferably about 10,000 or greater, even more preferably about 15,000 or greater and most preferably about 30,000 or greater. Preferably the high molecular weight resins have a weight average molecular weight of about 200,000 or less, more preferably about 100,000 or less and most preferably about 50,000 or less. The resins are present in sufficient amount to form a coherent film as the solvent or dispersant volatilize away. Preferably the resins are present in an amount of about 0.1 percent by weight or greater based on the weight of the activator, more preferably about 1 percent by weight or greater and most preferably about 5 percent by weight or greater. Preferably, the resins are present in an amount of about 30 percent by weight or less based on the weight of the activator, more preferably about 25 percent by weight or less and most preferably about 15 percent by weight or less.

In one embodiment all of the ingredients except the cycloaliphatic tertiary amine or the peroxide may be located in one part and the cycloaliphatic amine or peroxide is mixed with the other ingredients just before application. Such mixing can be achieved by any means known in the alt.

The composition of the invention further comprises one or more compounds containing one or more peroxide groups (—O—O—) which generate free radicals when contacted with the one or more compounds containing one or more cycloaliphatic tertiary amine groups. Any compound which contains one or more peroxide groups which form free radicals when contacted with the one or more compounds containing one or more cycloaliphatic tertiary amine groups can be utilized in this invention. Preferred classes of compounds containing one or more peroxide groups include peroxides, hydroperoxides, perbenzoates, peracids and dialkyl azodialkyronitriles the like. Included in preferred classes of such compounds are dialkyl peroxides, diacyl peroxides, hydroperoxides, peresters, and ketone hydroperoxides. Exemplary compounds containing one or more peroxide groups include benzoyl peroxide, cumene hydroperoxide, tertiary butyl hydroperoxide, dicumyl peroxide, di-t-butyl peroxide, 2,5-dimethyl-2,5-di-(tert-butylperoxy) hexyne-3, 2,5-dimethyl-2,5-di-(tert-butylperoxy)hexane, tertiary butyl peroxide acetate, tertiary butyl perbenzoate, ditertiary butyl azodiisobutyronitrile, methyl ethyl ketone hydroperoxide, and the like. The one or more compounds containing one or more peroxide groups are present in sufficient amount to initiate free radical polymerization so as to cure the composition. Preferably the one or more compounds containing one or more peroxide groups are present in an amount of about 0.05 percent by weight or greater based on the weight of the composition, more preferably about 0.1 percent by weight or greater and most preferably about 0.5 percent by weight or greater. Preferably, the one or more compounds containing one or more peroxide groups are present in an amount of about 5.0 percent by weight or less based on the weight of the composition, more preferably about 2.0 percent by weight or less and most preferably about 1.0 percent by weight or less. The one or more compounds containing one or more peroxide groups are preferably located in the composition in the embodiment where an activator is utilized.

The equivalents ratio of the one or more compounds containing one or more peroxide groups to the one or more compounds containing one or more cycloaliphatic tertiary amine groups is chosen such that the composition cures with reasonable speed, for instance to an adhesive which is capable of holding the substrates together under anticipated use conditions, preferably for a significant part or the entire anticipated life of the product. Preferably the equivalents ratio of the one or more compounds containing one or more peroxide groups to the one or more compounds containing one or more cycloaliphatic tertiary amine groups is about 1.0:1.0 or greater and more preferably about 50.0:1.0 or greater. Preferably the equivalents ratio of the one or more compounds containing one or more peroxide groups to the one or more compounds containing one or more cycloaliphatic tertiary amine groups is about 200:1.0 or less and more preferably about 100:1.0 or less. Equivalents ratio means the ratio of reactive groups of the recited compounds, for instance ratio of peroxide groups to cycloaliphatic tertiary amine groups.

The composition contains one of more acrylate containing components. The acrylate containing components comprise any compound (monomer, oligomer or prepolymer) having acrylate groups which react under the conditions of cure recited herein. Among preferred are acrylate containing monomers, oligomers and polymers. Among other specific classes of acrylate containing components are the one or more isocyanate functional prepolymers containing free acrylate groups, one or more adducts of a polyisocyanate and one or more compounds containing one or more acrylate groups and one or more active hydrogen containing groups. In some embodiments the acrylate containing components comprise any compound (monomer, oligomer or prepolymer) having acrylate groups and no isocyanate groups.

One class of acrylate containing components comprise one or more adducts of one or more polyisocyanates and one or more compounds containing one or more acrylate groups and one or more active hydrogen containing groups. Such adducts contain isocyanate groups and acrylate groups. Both the isocyanate and the acrylate groups participate in the cure of the adhesives of the invention. The isocyanate groups form urea or urethane linkages and the acrylates polymerize via free radical polymerization. The adducts can provide all or a portion of the acrylate groups needed to speed cure and enhance to modulus of the cured product. The adducts are prepared by contacting one or more compounds containing one or more acrylate groups and one or more active hydrogen containing groups and one or more polyisocyanates under conditions such that the adducts are prepared having both isocyanate and acrylate groups. The polyisocyanates described hereinbefore are useful in the preparation of the adducts. The compounds containing one or more acrylate groups and one or more active hydrogen containing groups are useful in the preparation of the adducts. Generally the conditions utilized for the formation of the adducts are similar to the conditions used to prepare isocyanate functional prepolymers, except that the reaction temperature is from about 50° C. to about 60° C., more preferably about 54° C. The equivalents ratio of the one or more polyisocyanates and one or more compounds containing one or more acrylate groups and one or more active hydrogen containing groups reacted is chosen to result in an adduct having both isocyanate and acrylate groups.

The acrylate containing component may comprise acrylate containing monomers, oligomers or prepolymers. The choice of the particular components is based on the ultimate properties desired in the cured adhesive. Any acrylate containing monomers, oligomers or prepolymers which provide the desired properties, cure rate and modulus may be utilized. Among preferred types of oligomers and prepolymers are urethane acrylates, such as aliphatic and aromatic urethane acrylates, epoxy acrylates, melamine acrylates, polyester acrylates, polyether acrylates, silicone acrylates, dendritic acrylates, polybutadiene acrylates, amine acrylates, acrylic acrylates, amido and spiro ortho carbonate esters or mixtures thereof. A more preferred class of oligomers and prepolymers are the aliphatic urethane acrylates. Examples of aliphatic urethane acrylate oligomers or prepolymers which are commercially available include those from Cytec Surface Specialties under the trademark EBECRYL and designations 264, 265, 284N, 1290, 4866, 8210, 8301, 8402, 8405, 5129 and 8411; those available from Sartomer under the designations CN985B88; 964, 944B85, 963B80, CN 929, CN 996, CN 968, CN 980, CN 981, CN 982B90, CN 983, CN991; CN 2920, CN 2921, CN 9006; CN 9008, CN 9009, CN 90.10; GENOMER 4302 and 4316 available from Rahn; PHOTOMER 6892 and 6008 available from Cognis; NK OLIGO™ U24A and U-15HA™ available from Kowa. Aliphatic urethane acrylates include the BR series of aliphatic urethane acrylates such as BR 144 or 970 available from Bomar Specialties or the LAROMER series of aliphatic urethane acrylates from BASF. The acrylate compounds may be monomeric in nature. Exemplary monomeric compounds include octyl(meth)acrylate, nonylphenol ethoxylate(meth)acrylate, isononyl(meth)acrylate, isobornyl(meth)acrylate, 2-(2-ethoxyethoxy)ethyl(meth)acrylate, 2-ethylhexyl(meth)acrylate, lauryl(meth)acrylate, beta-carboxyethyl(meth)acrylate, isobutyl(meth)acrylate, isodecyl(meth)acrylate, dodecyl(meth)acrylate, n-butyl(meth)acrylate, methyl(meth)acrylate, hexyl(meth)acrylate, (meth)acrylic acid, stearyl (meth)acrylate, hydroxy functional caprolactone ester (meth)acrylate, isooctyl(meth)acrylate, hydroxyethyl(meth)acrylate, hydroxymethyl(meth)acrylate, hydroxyl propyl (meth)acrylate, hydroxyisopropyl(meth)acrylate, hydroxybutyl(meth)acrylate, hydroxyl isobutyl(meth)acrylate, tetrahydrofurfuryl(meth)acrylate, 2-(2-oxy)ethyl acrylate, 2-phenoxy ethyl acrylate, hydroxylethyl acrylate, other long chain alkyl acrylates, isobornyl acrylate, cyclic trimethylol propane formal acrylate, monofunctional aliphatic urethane acrylates, ethylene glycol di(meth)acrylate, hexanediol di(meth)acrylate, triethylene glycol di(meth)acrylate, tetraethylene glycol di(meth)acrylate, dipropylene glycol di)meth)acrylate, trimethylolpropane tri(meth)acrylate, ethoxylated trimethylolpropane tri(meth)acrylate, glycerol tri(meth)acrylate, pentaerythritol tri(meth)acrylate, pentaerythritol tetra(meth)acrylate, tris(2-hydroxyl-ethyl)isocyanurate triacrylate ditrimethylolpropane tetra(meth)acrylate, and alkoxylated polyol derived di or poly acrylates, such as propoxylated neopentyl glycol diacrylate or propoxylated glycol triacrylate, neopentyl glycol di(meth)acrylate, diacrylates such as 1,6 hexanediol diacrylate, 1,9 nonanediol diacrylate, 1,4 butanediol acrylate, tricyclodecane dimethanol diacrylate, cyclohexane dimethanol diacrylate, alkoxylated cyclohexane diacrylates, tripropylene glycol diacrylate and the like. Most preferred acrylate and methacrylate compounds include methylmethacrylate, butyl methacrylate, 2-ethylhexylmethacrylate, tetrahydrofurfuryl methacrylate and cyclohexyl methyl methacrylate.

The monomers, oligomers and prepolymers containing acrylate groups and the residue of compounds containing acrylate groups (e.g. remainder of compounds containing active hydrogen containing groups and acrylate groups) are present in the curable compositions of the invention in a sufficient amount to provide the desired free acrylate content of the composition and to impart the desired cure speed and modulus to the cured composition. Preferably the amount of monomers, oligomers and prepolymers containing acrylate groups and the residue of compounds containing acrylate groups is about 1 percent by weight of greater based on the weight of the composition, more preferably about 5 percent by weight or greater, even more preferably about 10 percent by weight or greater, even more preferably about 15 percent by weight or greater, even more preferably about 20 percent by weight or greater, and most preferably about 40 percent by weight or greater. Preferably the amount of monomers, oligomers and prepolymers containing acrylate groups and the residue of compounds containing acrylate groups is about 70 percent by weight or less of the composition of the invention, more preferably about 60-percent by weight or less, even more preferably about 50 percent by weight or less, even more preferably 40 percent by weight or less and most preferably 20 percent by weight or less. In a two part composition the acrylate containing component may be present in either part, and are preferably present in both parts and may be utilized to balance the volumes of the two parts, provided it is not reactive with the other components in the part before contacting the parts.

The composition may further contain one or more promoters for free radical polymerization. Any promoter known in the all that promotes free radical polymerization may be used in this invention. A promoter is an organic salt of a transition metal, such as cobalt, nickel, manganese or iron naphthenate, copper octoate, copper acetylacetonate, iron hexoate, or iron propionate. Promoters are used to enhance cure rate. Promoters, whose effect varies greatly from system to system are used preferably in amounts of about 1 part per million and more preferably about 0.01 weight percent or greater. Promoters are used preferably in amounts of about 2.0 percent by weight or less and most preferably about 0.5 weight percent or less.

The composition of this invention may further comprise an adhesion promoter or adhesion promoting component, such as those disclosed in Mahdi, U.S. Patent Publication 2002/0100550 paragraphs 0055 to 0065 and Hsieh, U.S. Pat. No. 6,015,475 column 5, line 27 to column 6, line 41 incorporated herein by reference. Preferably the adhesion promoter contains a silane present in some form. Preferable methods of including silane functionality in the compositions are disclosed in Wu et al., U.S. Pat. No. 6,512,033 at column 5, line 38 to column 7, line 27; U.S. Pat. Nos. 5,623,044; 4,374,237; 4,345,053 and 4,625,012, relevant portions incorporated herein by reference. The silane may be blended with the prepolymer. In some embodiments the has one or more active hydrogen atom which are reactive with an isocyanate. Preferably such silane is a mercapto-silane or an amino-silane and more preferably is a mercapto-trialkoxy-silane or an amino-trialkoxy silane. In some embodiments, the silanes having, active hydrogen atoms reactive with isocyanate moieties, can be reacted with the terminal isocyanate moieties of the prepolymer. Such reaction products are disclosed in U.S. Pat. Nos. 4,374,237 and 4,345,053 relevant parts incorporated herein by reference. In other embodiments, silanes having reactive hydrogen moieties reactive with isocyanate moieties can be reacted into the backbone of the prepolymer by reacting such silane with the starting materials during the preparation of the prepolymer. The process for the preparation of prepolymers containing silane in the backbone is disclosed in U.S. Pat. No. 4,625,012, relevant portions incorporated herein by reference. Such silane, having-active hydrogen moieties, can be reacted with a polyisocyanate to form an adduct which is blended with the prepolymer reacted with a polyurethane prepolymer or reacted with a polyisocyanate and a compound having on average more than one moiety reactive with an isocyanate moiety. Preferably the adduct is a reaction product of a secondary amino- or mercapto-alkoxy silane and a polyisocyanate, the adduct having an average of at least one silane group and at least one isocyanate group per molecule (hereinafter "adduct"). The adduct level in the compositions is preferably in the range of about 0.5 percent to about 20 percent, more preferably in the range of about 1.0 percent to about 10 percent and most preferably in the range of about 2.0 percent to about 7 percent. The adduct may be prepared by any suitable method, such as, for example, by reacting an secondary amino- or mercapto-alkoxy silane with a polyisocyanate compound. Suitable polyisocyanates for use in preparing the adduct include those described above as suitable for use in preparing the prepolymer, particularly including isophorone diisocyanate, polymethyl-ene polyphenylisocyanates, and aliphatic polyisocyanate such as hexamethylene diisocyanate. Preferably, the polyisocyanate is an aliphatic polyisocyanate and is most preferably an aliphatic polyisocyanate based on hexamethylene diisocyanate. The polyisocyanate used to prepare the isocyanate silane adduct preferably has a molecular weight of less than about 2,000, more preferably less than about 1,000. Suitable organofunctional silanes include amino- or mercapto-alkoxy silanes. Examples of such compounds include: N,N-bis[(3-triethoxysilyl)propyl]amine; N,N-bis[(3-tripropoxy-silyl)propyl]amine; N-(3-trimethoxysilyl)propyl-3-[N-(3-trimethoxysilyl)-propyl amino]propionamide; N-(3-triethoxysilyl)propyl-3-[N-3-triethoxysilyl)-propyl-amino]propionamide; N-(3-trimethoxysilyl)propyl-3-[N-3-triethoxysilyl)-propylamino]propionamide; 3-trimethoxysilylpropyl 3-[N-(3-trimethoxysilyl)-propylamino]-2-methylpropionate; 3-triethoxysilyl propyl 3-[N-(3-triethoxysilyl)-propylamino]-2-methyl propionate; 3-trimethoxysilylpropyl 3-[N-(3-triethoxysilyl)-propylamino]-2-methyl propionate; and the like. Preferably the organo functional silane is gamma-mercaptopropyl-trimethoxysilane (available as A189 from Union Carbide) or N,N'-bis((3-trimethoxysilyl)propyl)amine. The amount of adhesion promoter present is that amount which enhances the adhesion of the adhesive to the substrate surface. The amount of adhesion promoter present is preferably about 0.1 percent by weight or greater based on the weight of the adhesive and most preferably about 0.5 percent by weight or greater. The amount of adhesion promoter used is preferably about 10 percent by weight or less and most preferably about 2.0 percent by weight or less. The adhesion promoter can be located in either or both parts of a two part adhesive, in the one part adhesive and for in the activator.

The composition may further comprise one or more isocyanate functional prepolymers containing one or more polyester based polyols which are solid at ambient temperature, about 23° C. The polyester based polyols have melting points such that the prepolymer provides sufficient green strength to prevent the substrates from moving in relation to one another due to gravitational forces at ambient temperatures. In terms of installing a window in a vehicle or building, the polyester based prepolymer prevents the window from sliding after installation. Preferably, the polyester polyols have melting points of about 40° C. or greater, even more preferably about 45° C. or greater and most preferably about 50° C. or greater. Preferably, the polyester polyols exhibit melting points of about 85° C. or less, even more preferably about 70° C. or less and most preferably about 60° C. or less. The polyester based isocyanate prepolymer can be prepared using one or more polyester polyols and preferably an aromatic polyisocyanate. In order to facilitate pumpability, it may be diluted with a plasticizer. The amount of polyester polyol in the prepolymer is a sufficient amount to support pumpability of the composition of the invention. Preferably, the polyester polyol based isocyanate prepolymer is present in the composition in sufficient amount to enhance the needed green strength and rheology of the composition. If the amount is too high, the composition is not hand gun applicable at ambient temperature. Preferably, the polyester polyol based isocyanate prepolymer is present in the composition in an amount of about 0 percent by weight or greater based on the weight of the composition, more preferably about 1 percent by weight or greater and most preferably about 2 percent by weight or greater. Preferably, the polyester polyol based isocyanate prepolymer is present in the composition in an amount of about 10 percent by weight or less, even more preferably about 5 percent by weight or less and most preferably about 3 percent by weight or less. The one or more isocyanate functional prepolymers containing one or more polyester based polyols are preferably located in the resin or A side of a two part adhesive.

The composition of the invention also preferably contains one or more plasticizers or solvents to modify rheological properties to a desired consistency. Such materials should be free of water, inert to isocyanate groups and compatible with the prepolymer. Such material may be added to the reaction mixtures for preparing the isocyanate functional components, such as prepolymers, or to the mixture for preparing the final composition, but is preferably added to the reaction mixtures for preparing the prepolymer and the adduct, so that such mixtures may be more easily mixed and handled. Exemplary plasticizers and solvents are well known in the art and include straight and branched alkylphthalates, such as diisononyl phthalate, dioctyl phthalate and dibutyl phthalate, a partially hydrogenated terpene commercially available as "HFB-40", trioctyl phosphate, epoxy plasticizers, toluene-sulfamide, chloroparaffins, adipic acid esters, castor oil, xylene, 1-methyl-2-pyrrolidinone and toluene. The amount of plasticizer used is that amount sufficient to give the desired rheological properties and disperse the components in the composition of the invention. Preferably, the plasticizer is present in the compositions of the invention in an amount of about 0 part by weight or greater, more preferably about 5 percent by weight or greater and most preferably about 1.0 percent by weight or greater. The plasticizer is preferably present in an amount of about 35 percent by weight or less and most preferably about percent by weight or less. The plasticizer may be present in one or both parts of a two part composition. It is preferable that some plasticizer be present in the resin. A part, with the isocyanate functional prepolymers.

The compositions may further comprise one or more polyfunctional isocyanates for the purpose of improving the modulus of the composition in the cured form. "Polyfunctional" as used in the context of the isocyanates refers to isocyanates having a functionality of 2 or greater. The polyisocyanates can be any monomeric, oligomeric or polymeric isocyanates having a nominal functionality of about 3 or greater. More preferably, the polyfunctional isocyanates have a nominal functionality of about 3.2 or greater. Preferably, the polyfunctional isocyanates have a nominal functionality of about 5 or less, even more preferably about 4.5 or less and most preferably about 4.2 or less. The polyfunctional isocyanates can be any isocyanates which are reactive with the isocyanate polyisocyanate prepolymers and/or isocyanate reactive components used in the composition and which improve the modulus of the cured composition. The polyisocyanates can be monomeric; trimeric isocyanurates or biurets of monomeric isocyanates; oligomeric or polymeric, the reaction product of several units of one or more monomeric isocyanates. Examples of preferred polyfunctional isocyanates include trimers of hexamethylene diisocyanate, such as those available from Bayer under the trademark and designation DESMODUR N3300, DESMODUR N-100, and polymeric isocyanates such as polymeric MDI (methylene diphenyl diisocyanates) such as those marketed by The Dow Chemical Company under the trademark of PAPI, including PAPI 20 and PAPI 27 polymeric isocyanate. The polyfunctional isocyanates are present in a sufficient amount to impact the modulus of the cured compositions of the invention. If too much is used, the cure rate of the composition is unacceptably slowed down. If too little is used, the desired modulus levels may not be achieved. The polyfunctional isocyanate is preferably present in an amount of about 0.5 percent by weight or greater based on the weight of the composition, more preferably about 1.0 percent by weight or greater and most preferably about 1.4 percent by weight or greater. The polyfunctional isocyanate is preferably present in an amount of about 8 percent by weight or less, based on the weight of the composition, more preferably about 5 percent by weight or less and most preferably about 3 percent by weight or less. The one or more polyfunctional isocyanates are preferably located in the resin or A side of a two part composition.

The composition may further comprise stabilizers, which function to protect the adhesive composition from moisture, thereby inhibiting advancement and preventing premature crosslinking of the isocyanates in the curable composition. Stabilizers known to the skilled artisan for moisture curing adhesives may be used herein. Included among such stabilizers are diethylmalonate, alkylphenol alkylates, paratoluene sulfonic isocyanates, benzoyl chloride and orthoalkyl formates. Such stabilizers are preferably used in an amount of about 0.1 percent by weight or greater based on the total weight of the curable composition, preferably about 0.5 percent by weight or greater and more preferably about 0.8 percent by weight or greater. Such stabilizers are used in an amount of about 5.0 percent by weight or less based on the weight of the curable composition, more preferably about 2.0 percent by weight or less and most preferably about 1.4 percent by weight or less.

The adhesive composition may further comprise a hydrophilic material that functions to draw atmospheric moisture into the composition. This material enhances the cure speed of the formulation by drawing atmospheric moisture to the composition. Preferably, the hydrophilic material is a liquid. Among preferred hydroscopic materials are pyrrolidones such as 1 methyl-2-pyrrolidone (or N-methylpyrrolidone). The hydrophilic material is preferably present in an amount of about 0.1 percent by weight or greater based on the weight of the composition and more preferably about 0.3 percent by weight or greater. The hydrophilic material is preferably present in an amount of about 1.0 percent by weight or less and most preferably about 0.6 percent by weight or less.

The composition may further include reinforcing fillers, well-known to those skilled in the art, including carbon black, titanium dioxide, calcium carbonate, surface treated silica, titanium oxide, fumed silica, and talc, with carbon black preferred. In some embodiments, more than one reinforcing filler may be used, of which one is carbon black in a sufficient amount to color to the composition black. Preferably, the only reinforcing filler used is carbon black. The reinforcing fillers are used in a sufficient amount to increase the strength of the composition and to provide thixotropic properties to the composition. Preferably, the reinforcing filler is present in an amount of about 1 percent by weight of the composition or greater, more preferably about 15 percent by weight or greater and most preferably about 20 percent by weight or greater. Preferably, the reinforcing filler is present in an amount of about 40 percent by weight of the composition or less, more preferably about 35 percent by weight or less and most preferably about 33 percent by weight or less. Among optional materials in the composition are clays. Preferred clays useful in the invention include kaolin, surface treated kaolin, calcined kaolin, aluminum silicates and surface treated anhydrous aluminum silicates. The clays can be used in any form which facilitates formulation of a pumpable composition. Preferably, the clay is in the form of pulverized powder, spray dried beads or finely ground particles. Clays may be used in an amount of about 0 percent by weight of the composition or greater, more preferably about 1 percent by weight or greater and even more preferably about 6 percent by weight or greater. Preferably, the clays are used in an amount of about 0.20 percent by weight or less of the composition and more preferably about 15 percent by weight or less.

The two part compositions of the invention comprise a curing agent located in the second part. Such curing agent comprises one of more compounds that contain greater than one isocyanate reactive group. The curing agents preferably contain hydroxyl or amine functional groups. The curing agents can be one or more one or more low molecular weight compounds, polyols or polyamines. Polyols as described hereinbefore can be utilized as curing agents. One class of polyols or polyamines can be prepolymers as described hereinbefore prepared utilizing excess equivalents of isocyanate reactive groups such that the resulting prepolymers contain isocyanate reactive groups, preferably hydroxyl and or amino groups.

The one or more low molecular weight compounds have two or more isocyanate reactive groups and a hydrocarbon backbone wherein the backbone may further comprise one or more heteroatoms. It is advantageous to use such low molecular weight compounds in two-part compositions. Such low molecular weight compounds may be compounds known in the art as chain extenders, such compounds are difunctional, or crosslinkers, which have, on average, greater than two active hydrogen groups per compound. The heteroatoms in the backbone can be oxygen, sulfur, nitrogen or a mixture thereof, wherein oxygen, nitrogen or a mixture thereof is more preferred and oxygen most preferred. Preferably, the molecular weight of the low molecular weight compound is about 120 or less and more preferably about 100 or less. Preferably, the low molecular weight compound comprises one or more multifunctional alcohols, multifunctional alkanol amines, one or more adducts of multifunctional alcohol and an alkylene oxide, one or more adducts of a multifunctional alkanol amine and an alkylene oxide or a mixture thereof. Among preferred multifunctional alcohols and multifunctional alkanol amines are ethane diol, propane diol, butane diol, hexane diol, heptane diol, octane diol, glycerine, trimethylol propane, pentaerythritol, neopentyl glycol, ethanol amines (diethanol amine, triethanol amine) and propanol amines (di-isopropanol amine, tri-isopropanol amine) and the like. Blends of various low molecular weight compounds may be used. The low molecular weight compound is used in a sufficient amount to obtain the desired G-Modulus (E-Modulus). In two-part compositions, the low molecular compound may be located in the resin side, the curative side or both. Preferably, the low molecular weight compound is located in the curative side. Preferably, the low molecular weight compound is present in the composition in an amount of about 2 percent by weight or greater, more preferably about 2.5 percent by weight or greater and most preferably about 3.0 percent by weight or greater. Preferably, the low molecular weight compound is present in the composition in an amount of about 10 percent by weight or less, more preferably about 8 percent by weight or less and most preferably about 6 percent by weight or less.

In a two-part curable composition, the curative part (B) may further comprise polyoxyalkylene polyamine having 2 or greater amines per polyamine, preferably 2 to 4 amines per polyamine and most preferably 2 to 3 amines per polyamine. Preferably, the polyoxyalkylene polyamine has a weight average molecular weight of about 200 or greater and most preferably about 400 or greater. Preferably, the polyoxyalkylene polyamine has a weight average molecular weight of about 5,000 or less and most preferably about 3,000 or less. Among preferred polyoxyalkylene polyamines are JEFFAMINE™ D-T-403 polypropylene oxide triamine, molecular weight of about 400 and JEFFAMINE™ 400 polypropylene oxide diamine, molecular weight of about 400. The polyoxyalkylene polyamines are present in a sufficient amount to prevent the composition from sagging once applied. Preferably, the polyoxyalkylene polyamine is present in the curable composition in an amount of about 0.2 percent by weight or greater, more preferably about 0.3 percent by weight or greater and most preferably about 0.5 percent by weight or greater. Preferably, the polyoxyalkylene polyamine is present in the curable composition in an amount of about 6 percent by weight or less, more preferably about 4 percent by weight or less and most preferably about 2 percent by weight or less.

Other components commonly used in curable compositions may be used in the compositions of this invention. Such materials are well known to those skilled in the art and may include ultraviolet stabilizers and antioxidants and the like. The compositions of the invention may also contain durability stabilizers known in the art. Among preferred durability stabilizers are alkyl substituted phenols, phosphites, sebacates and cinnamates. A preferred class of durability stabilizers includes organophosphites. The organophosphites are preferably present in a sufficient amount to enhance the durability of bond of the adhesive composition to the substrate surface. Preferably at least one of the phosphorous atoms is bonded to an oxygen atom which is bonded to an aromatic moiety, such as a phenyl. Preferably at least one of the phosphorous atoms is bonded to an oxygen atom bonded to an alkyl moiety. Such phosphites are disclosed in Hsieh et al. U.S. Pat. No. 7,416,599 column 10, line 47 to Column 11 line 25, incorporated herein by reference. Among preferred organophosphites are poly(dipropyleneglycol) phenyl phosphite (available from Dover Chemical Corporation under the trademark and designation DOVERPHOS 12), tetrakis isodecyl 4,4'isopropylidene diphosphite (available from Dover Chemical Corporation under the trademark and designation DOVERPHOS 675), and phenyl diisodecyl phosphite (available from Dover Chemical Corporation under the trademark and designation DOVERPHOS 7). Preferably, the organophosphite is present in the composition in an amount of about 0.1 percent by weight or greater and more preferably about 0.2 percent by weight or greater based on the weight of the composition. Preferably the organophosphite is present in the composition in an amount of about 1.0 percent by weight or less and more preferably about 0.5 percent by weight or less based on the weight of the composition.

In a preferred embodiment, the composition of the invention may further include a light stabilizer. Any light stabilizer which facilitates the system maintaining durable bond to the substrate for a significant portion of the life of the structure to which it is bonded may be used. Preferred light stabilizers are hindered amine light stabilizers. Exemplary hindered amine light stabilizers are disclosed in Hsieh et al. U.S. Pat. No. 7,416,599 column 11, line 31 to line 63, incorporated herein by reference. More preferred hindered light amine stabilizers include Tinuvin 1,2,3 bis-(1-octyloxy-2,2,6,6, tetramethyl-4-piperidinyl) sebacate and Tinuvin 765, bis(1,2,2,6,6,-penta methyl-4-piperidinyl) sebacate. A sufficient amount of light stabilizer to enhance the bond durability to the substrate may be used. Preferably, the light stabilizer is used in amount of about 0.1 percent by weight or greater based on the weight of the composition, more preferably about 0.2 percent by weight or greater and most preferably about 0.3 percent by weight or. Preferably, the light stabilizer is present in an amount of about 3 weight percent or less based on the weight of the composition, more preferably about 2 weight percent or less and most preferably about 1 weight percent or less.

In another preferred embodiment, the composition may further comprise an ultraviolet light absorber. Any ultraviolet absorber which enhances the durability of the bond of the composition to a substrate may be used. Preferred UV light absorbers include benzophenones and benzotriazoles. Exemplary UV light absorbers include those disclosed in Hsieh et al. U.S. Pat. No. 7,416,599 column 11, line 64 to Column 12 line 29, incorporated herein by reference. More preferred UV light absorbers include Cyasorb UV-531 2-hydroxy-4-n-octoxybenzophenone and Tinuvin 571 2-(2H-benzotriazol-2-yl)-6-dodecyl-4-methylphenol, branched and linear. Preferably, the UV light absorber is used in sufficient amount to enhance the durability of the bond of the adhesive to the substrate. Preferably, the UV absorber is used in an amount of about 0.1 percent by weight or greater based on the weight of the composition, more preferably about 0.2 weight percent or greater and most preferably about 0.3 weight percent or greater. Preferably, the UV light inhibitor is used in amount of about 3 percent by weight or less based on the weight of the composition, more preferably about 2 percent by weight or less and most preferably about 1 percent by weight or less.

The one part composition or each component for each part of a two part composition may be formulated by blending the components together using means well known in the art. Generally, the components are blended in a suitable mixer. Such blending is preferably conducted in under vacuum or in an inert atmosphere, such as nitrogen or argon, in the absence of oxygen and atmospheric moisture to prevent premature reaction. It may be advantageous to add plasticizers to the reaction mixture for preparing the isocyanate functional prepolymers so that such mixtures may be easily mixed and handled. Alternatively, the plasticizers can be added during blending of all the components. The ingredients are blended for a sufficient time to prepare a well blended mixture, preferably from about 10 to about 60 minutes. Once the composition is formulated, it is packaged in a suitable container such that it is protected from atmospheric moisture and oxygen. Contact with atmospheric moisture and oxygen could result in premature crosslinking of the prepolymers containing isocyanate groups.

The components of activator are blended in the solvent of dispersant under conditions such that a stable homogeneous composition is formed. The activator composition may be prepared to have concentrations of components for final application as described hereinbefore. Stable as used herein with respect to the composition of the invention means that the components remain in solution or dispersion for a period of three months or greater when stored at ambient temperatures, from 20 to 30° C. and more preferably for a period of 6 months and most preferably for a period of 12 months. This is also known in the art as the shelf life of the composition. The activator and the one or two part composition of the invention may be packaged in separate containers until it is desired to contact the activator and the composition of the invention. In one embodiment the contacting can take place in a place remote from such packaging.

The compositions of the invention may be used to bond a variety of substrates together as described hereinbefore. The composition can be used to bond porous and nonporous substrates together. The composition is applied to a substrate and the composition on the first substrate is thereafter contacted with a second substrate. In preferred embodiments, the surfaces to which the composition is applied are cleaned, activated and/or primed prior to application, see for example, U.S. Pat. Nos. 4,525,511; 3,707,521 and 3,779,794, relevant, parts of all are incorporated herein by reference. Generally the one part adhesive compositions of the invention are applied at temperatures at which the compositions can be, pumped. The one part adhesive compositions cure in the presence of atmospheric moisture. Exposure to atmospheric moisture is sufficient to result in curing of the composition. Curing can be accelerated by the addition of additional water or by applying heat to the curing composition by means of infrared heat, convection heat, microwave heating, application of ultrasonic vibration and the like. Preferably, the one part adhesive compositions of the invention are formulated to provide an open time of at least about 3 minutes or greater more preferably about 5 minutes or greater. Preferably, the one part adhesive compositions of the invention are formulated to provide an open time of at least about 30 minutes or less and more preferably about 15 minutes or less. "Open time" is understood to mean the time after application of the composition to a first substrate until it starts to become a high viscous paste and is not subject to deformation during assembly to conform to the shape of the second substrate and to adhere to it.

The compositions of the invention may used to bond glass to other substrates such as metal or plastics. In a preferred embodiment, the first substrate is a glass or scratch resistant plastic window and the second substrate is a window frame. In another preferred embodiment the first substrate is a window and the second substrate is a window frame of an automobile. Preferably, the window is cleaned and may have a glass wipe or primer applied to the area to which the adhesive is to be bonded. The window-flange may be primed with a paint primer. In one embodiment; the window and/or flange or window frame may be contacted with an activator of the invention prior to applying a composition according to the invention to the window and/or flange or window frame. The composition is applied in a bead to the periphery of the window located such that it will contact the window flange when placed in the vehicle. The window with the composition located thereon is then placed into the flange with the composition located between the window and the flange. The bead of the composition is a continuous bead that functions to seal the junction between the window and the window flange. A continuous bead of the composition is a bead that is located such that the bead connects at each end to form a continuous seal between the window and the flange when contacted. Thereafter, the composition is allowed to cure. The compositions of the invention can be used to bond replacement windows into a structure. In this embodiment, the old window or a portion thereof is removed from the window flange or frame. This is typically achieved by cutting the old adhesive between the glass and the flange or frame. In some circumstances, the portion of the old adhesive remaining on the flange or window frame is left on the frame or flange. The portion of the flange or frame that does not have old adhesive deposited thereon can be primed. The composition of this invention can be applied to the frame or flange over the old adhesive and it will bond to the old adhesive. Generally the old adhesive is a polyurethane, siloxane, siloxy functional polyether or siloxy functional polyolefin.

In use, the components of two-part compositions are blended as would normally be done when working with such materials. For a two-part compositions to be most easily used in commercial and industrial environments, the volume ratio at which the two parts are combined should be a convenient whole number. This facilitates application of the curable composition with conventional, commercially available dispensers including static and dynamic mixing. Such dispensers with static mixing are shown in U.S. Pat. Nos. 4,538,920 and 5,082,147 (incorporated herein by reference) and are available from Conprotec, Inc. (Salem, N.J.) under the trade name MIXPAC or SULZER™ QUADRO of Sulzer Ltd., Switzerland. Typically, these dispensers use a pair, of tubular receptacles arranged side-by-side with each tube being intended to receive one of the two parts of the polymerizable composition. Two plungers, one for each tube, are simultaneously advanced (e.g., manually or by a hand-actuated ratcheting mechanism) to evacuate the contents of the tubes into a common, hollow, elongated mixing chamber that may also contain a static mixer to facilitate blending of the two parts. The blended polymerizable composition is extruded from the mixing chamber onto a substrate. When using electrically-driven equipment, dynamic mixing may be used. Once the tubes have been emptied, they can be replaced with fresh tubes and, the application process continued. The volumetric ratio at which the two parts of the polymerizable composition are combined is controlled by the diameter of the tubes. (Each plunger is sized to be received within a tube of fixed diameter, and the plungers are advanced into the tubes at the same speed.) A single dispenser is often intended for use with a variety of different two-part polymerizable compositions and the plungers are sized to deliver the two parts of the polymerizable composition at a convenient mix ratio. Some common mix ratios are 1:1, 2:1, 4:1 and 10:1 and can also be odd ratios. Preferably, the two parts are blended at a mix ratio of about 1:1.

Preferably, the mixed two-part compositions of the invention have a suitable viscosity to allow application without dripping. Preferably, the viscosities of the two individual components should be of the same order of magnitude. For lower viscosities, the components may require gelling agent known in the art to prevent sag of the uncured adhesive system. Two-part adhesive compositions start to cure upon mixing the two parts. Curing can be accelerated by applying heat to the curing adhesive by means of infrared heat, induction heat; convection heat, microwave heating, application of ultrasonic vibration and the like.

In another embodiment, the invention is a process comprising: a) applying an activator to a surface of a substrate; and b) wiping the applied composition off of the surface of the substrate or allowing a major portion of the solvent or dispersant in the composition to evaporate off of the surface of the substrate. The activator may be applied by any means well known in the art. It may be applied manually by spraying, brushing, rolling or applying an absorbent material, such as a cloth, containing the activator to the surface of a substrate to which the adhesive will be applied such that a sufficient amount of the activator is applied to the surface. The activator can be applied by hand using an absorbent material such as a felt or sponge applicator, a primer stick or by robotic application, utilizing machines such as automated felt applicator as, e.g., provided by Nordson Deutschland. GmbH, Erkrath, Germany or automated spray application equipment as e.g., provided by SCA Schucker GmbH, Bretten-Glöhausen, Germany or the M7101 robotic system, or available from Fanuc Robotics America, of Rochester Hills, Mich. used with an automated primer dispense applicator supplied by Nordson Corporation, Amherst, Ohio. In one embodiment, the activator of the invention is applied and the solvent or dispersant is allowed to evaporate away from the surface of the substrate. In another embodiment, an absorbent material, such as described hereinbefore, is wiped over the substrate to which the activator was applied. Generally, this results in removal of the solvent or dispersant and leaves some of the other components of the activator on the surface of the substrate. The process of the invention may further comprise contacting a first substrate with an adhesive and a second substrate wherein the adhesive is applied to the portion of the surface of the first substrate to which the composition was applied and the adhesive is disposed between the first and the second substrates. In the embodiment wherein solvent or dispersant is allowed to evaporate away, the adhesive can be applied after sufficient time such that the adhesive durably bonds to the surface of the substrate. Preferably the flash time, that is the time the solvent or dispersant is allowed to evaporate away, is at least about 60 seconds, more preferably at least about 20 seconds, and most preferably at least about 10 seconds. In a preferred embodiment, the composition of the invention preferably enhances adhesion after application and before adhesive application for 30 days or less, more preferably 7 days or less, more preferably 3 days or less and even more preferably 60 minutes or less.

Preferably the cure rate is determined by determining the dynamic yield stress, measured by G' on a rheometer. Preferably the G' is $6\times10^6$ Pa the strength of the curing adhesive at a designated time. In another embodiment the compositions of the invention can be used to bond modular components to a car body or to each other. Examples of modular components include vehicle modules, such as door, window or body. Molecular weights as described herein are number average molecular weights which may be determined by Gel Permeation Chromatography (also referred to as GPC). For polyurethane prepolymers, it is also possible to calculate approximate number average molecular weight from the equivalent ratio of the isocyanate compounds aid of the polyol compounds with which they are reacted as known to the persons skilled in the art.

ILLUSTRATIVE EMBODIMENTS OF THE INVENTION

The following examples are provided to illustrate the invention, but are not intended to limit the scope thereof. All parts and percentages are by weight unless otherwise indicated.

Preparation of Isocyanate Functional Prepolymer Containing Acrylate Groups 200 grams of methylene diphenyl diisocyanate and 250 grams of diisononyl phthalate are charged into a 4-liter kettle equipped with an agitator and a heating jacket under nitrogen protection. The reactants are mixed and heated under nitrogen until the mixture reaches 45° C. Once the mixture reaches 45° C., 50 grams of hydroxyethyl acrylate are added slowly and the temperature is monitored to keep the temperature below 54° C. The reaction is monitored and samples are tested for isocyanate content by titration. When the desired isocyanate content is reached 5 grams of diethyl malonate are added. The mixture is agitated for 15 minutes at 52-54° C. Thereafter, the resulting prepolymer having an isocyanate content of 6 percent is packaged in an air tight container.

Two Part Adhesive Preparation

An amount of the prepolymer is placed in a cup and sealed. Half of the acrylate monomer is placed in a separate cup, and peroxide is added. Then the components are hand mixed. The mixture is contacted with the prepolymer. The second half of the acrylate monomer is placed in a separate cup and peroxide is added. Then, the components are hand mixed. The mixture is contacted with the prepolymer and the other half of the acrylate monomer. The components are mixed slowly with a tongue depressor. The mixing cup is sealed and placed in a speed mixer and mixed at 2100 rpm for 40 seconds. If needed, the mixing steps are repeated until the components are homogeneous. The mixing should be performed so that the temperature does not exceed 40° C. In one example, 12 grams of methyl methacrylate, 27 grams of prepolymer, 1.2 grams of t-butyl peroxybenzoate are used. The target isocyanate content is 6.7 percent by weight. 0.4 grams of N-phenyl-2-propyl-3,5-pyridine or dimorpholino diethyl ether are added to 10 grams of the mixture and bag mixed for 15 seconds. The G modulus of the compositions prepared is tested by determining the dynamic yield stress on a rheometer. The results are illustrated in FIG. 1, which shows that the presence of dimorpholino diethyl ether DMDEE (a cycloaliphatic tertiary amine) impacts the cure of the adhesive while N-phenyl-2-propyl-3,5-pyridine 808HP (an aromatic tertiary amine) does not.

Any numerical values recited in the above application include all values from the lower value to the upper value in increments of one unit provided that there is a separation of at least 2 units between any lower value and any higher value. As an example, if it is stated that the amount of a component or a value of a process variable is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value, and the highest value enumerated are to be considered to be expressly stated in this application in a similar manner. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

What is claimed is:

1. A composition comprising:
   a) one or more isocyanate functional prepolymers containing free acrylate groups wherein the isocyanate functional prepolymers are derived from aromatic isocyanates and the free acrylate content of the isocyanate functional prepolymers is about 1.0 to about 20 percent by weight;
   b) one or more compounds containing a cycloaliphatic tertiary amine;
   c) one or more compounds containing a peroxide group; and,
   d) one or more acrylate containing components comprising one or more compounds having acrylate groups and no isocyanate groups or one or more adducts of a polyisocyanate and one or more compounds containing one or more acrylate groups and one or more active hydrogen containing groups;

wherein components a) and b) are kept separate from component c) unto cure is desired.

2. A composition according to claim 1 wherein the composition comprises:
   a) from about 10 to about 70 percent by weight of the one or more isocyanate functional prepolymers containing free acrylate groups;
   b) from about 0.05 to about 20.0 percent by weight of the one or more compounds containing a cycloaliphatic tertiary amine:
   c) from about 0.05 to about 5 percent by weight of the one or more compounds containing a peroxide group;
   d) from about 1 to about 70 percent by weight of the one or more acrylate containing components.

3. A composition according to claim 1 wherein the composition comprises a one part adhesive and activator wherein the one part adhesive comprises a) the one or more isocyanate functional prepolymers containing free acrylate groups; c) the one or more compounds containing a peroxide group; d) the one or more acrylate containing components and the activator comprises the one or more compounds containing a cycloaliphatic tertiary amine.

4. A composition according to claim 3 wherein the activator further comprises a solvent or dispersant for the one or more compounds containing a cycioaliphatic tertiary amine.

5. A composition according to claim 4 wherein the free acrylate content of the isocyanate functional prepolymers is about 0.05 to about 10.0 percent by weight.

6. A composition according to claim 4 wherein the activator further comprises a film forming resin.

7. A composition according to claim 1 wherein the weight ratio of the or more compounds containing a peroxide group to the one or more compounds containing a cycloaliphatic tertiary amine is from about 50.0:1.0 to about 100:1.0.

8. A two part composition comprising:
   in one part
      a) one or more isocyanate functional prepolymers derived from aromatic isocyanates;
      c) one or more compounds containing a peroxide group; and,
      d) one or more acrylate containing components which comprise one or more compounds having acrylate groups and no isocyanate groups or one or more adducts of a polyisocyanate and one or more compounds containing one or more acrylate groups and one or more active hydrogen containing groups; and
   in a second part b) one or more compounds containing a cycloaliphatic tertiary amine;
   wherein the weight ratio of one or more compounds containing a peroxide group to the one or more compounds containing a cycloaliphatic tertiary amine is from about 50.0:1.0 to about 100:1.0.

9. A composition according to claim 8 wherein the one or more isocyanate containing prepolymers contain from about 0.1 to about 35 percent by weight of free isocyanate groups.

10. A composition according to claim 8 wherein one or more of the isocyanate functional prepolymers contain free acrylate groups and the free acrylate content of the isocyanate functional prepolymers is about 1.0 to about 20 percent by weight.

11. A composition according to claim 8 wherein the composition comprises:
   a) from about 10 to about 70 percent by weight of the one or more isocyanate functional prepolymers;
   b) from about 0.05 to about 20.0 percent by weight of the one or more compounds containing a cycloaliphatic tertiary amine:
   c) from about 0.05 to about 5 percent by weight of the one or more compounds containing a peroxide group;
   d) from about 1 to about 70 percent by weight of the one or more acrylate containing components.

12. A composition according to claim 1 wherein the weight ratio of the one or more compounds containing a peroxide group to the one or more compounds containing a cycloaliphatic tertiary amine is from about 1.0:1.0 to about 200:1.0.

13. A composition according to claim 12 wherein the active hydrogen containing groups on the one or more compounds containing one or more eon/late groups and one or more active hydrogen containing groups are hydroxyl or amine groups.

14. A composition according to claim 1 wherein the one or more isocyanate containing prepolymers contain from about 0.1 to about 35 percent by weight of free isocyanate groups.

15. A composition according to claim 1 wherein the composition is a two part adhesive.

\* \* \* \* \*

UNITED STATES PATENT AND TRADEMARK OFFICE
CERTIFICATE OF CORRECTION

| | | |
|---|---|---|
| PATENT NO. | : 9,045,672 B2 | Page 1 of 1 |
| APPLICATION NO. | : 13/455294 | |
| DATED | : June 2, 2015 | |
| INVENTOR(S) | : Gary L. Jialanella | |

It is certified that error appears in the above-identified patent and that said Letters Patent is hereby corrected as shown below:

In the Claims

Column 29, Line 25, "cycioaliphatic" should be "cycloaliphatic"

Column 30, Line 35, "eon/late" should be "acrylate"

Signed and Sealed this
Sixth Day of October, 2015

Michelle K. Lee
*Director of the United States Patent and Trademark Office*